United States Patent [19]
Montgomery

[11] 3,955,727
[45] May 11, 1976

[54] CARRIER BAGS FOR BICYCLES

[75] Inventor: Joseph S. Montgomery, Stamford, Conn.

[73] Assignee: Cannondale Corporation, Stamford, Conn.

[22] Filed: Jan. 31, 1975

[21] Appl. No.: 546,141

[52] U.S. Cl. .............................. 224/31; 224/32 A; 150/28 R; 150/31
[51] Int. Cl.² .................... B62J 7/04; A45C 13/04
[58] Field of Search .............. 224/31, 32 A, 32 R, 224/30 R, 30 A, 39 R, 36, 35, 33, 41, 42.46 R, 43, 44; 150/28 R, 2.1, 46, 31

[56] References Cited
UNITED STATES PATENTS
3,786,972  1/1974  Alley .......................... 224/32 A X FOREIGN PATENTS OR APPLICATIONS
584,835   1/1947   United Kingdom ............. 224/32
140,627   4/1920   United Kingdom ............. 224/36
24,828    11/1907  United Kingdom ............. 224/36

Primary Examiner—Robert J. Spar
Assistant Examiner—Jerold M. Forsberg
Attorney, Agent, or Firm—Brumbaugh, Graves, Donohue & Raymond

[57] ABSTRACT

A carrier bag for attachment to a bicycle comprises an enclosure of semi-flexible material and a substantially rigid, three-dimensional frame received within the enclosure, the frame being shaped to match and being in engagement with at least two adjacent wall of the enclosure, one of which is the rear wall. The elements for attaching the bag to the bicycle are attached to the frame, and a load in the bag is transmitted into the rigid frame from the enclosure and is, in turn, transmitted from the frame to the bicycle.

12 Claims, 5 Drawing Figures

U.S. Patent  May 11, 1976  Sheet 1 of 2  3,955,727
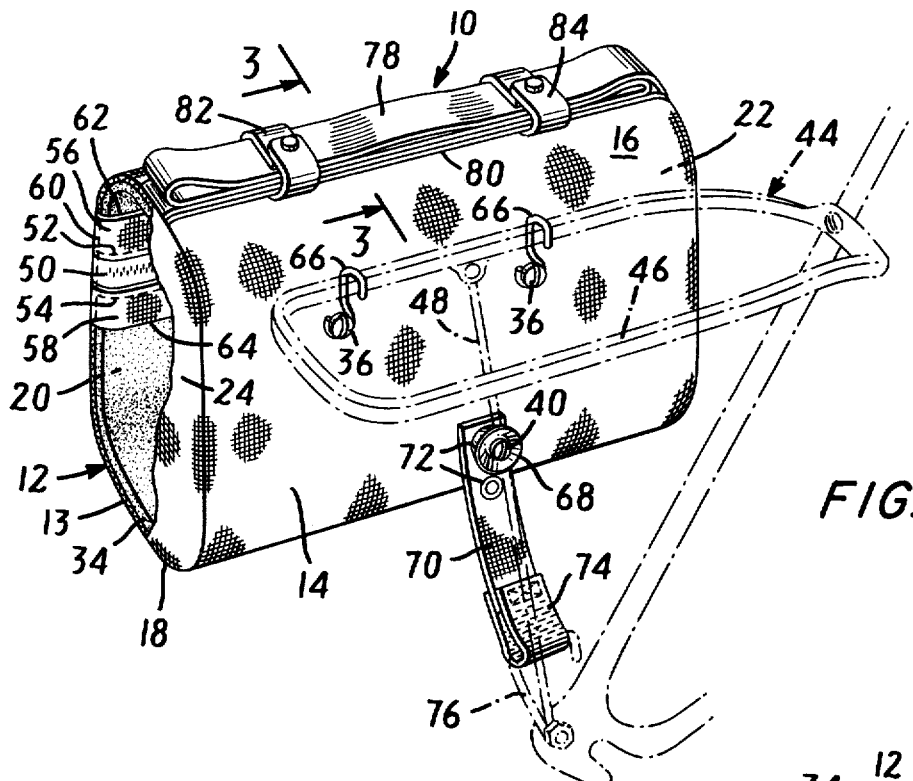
FIG. 2
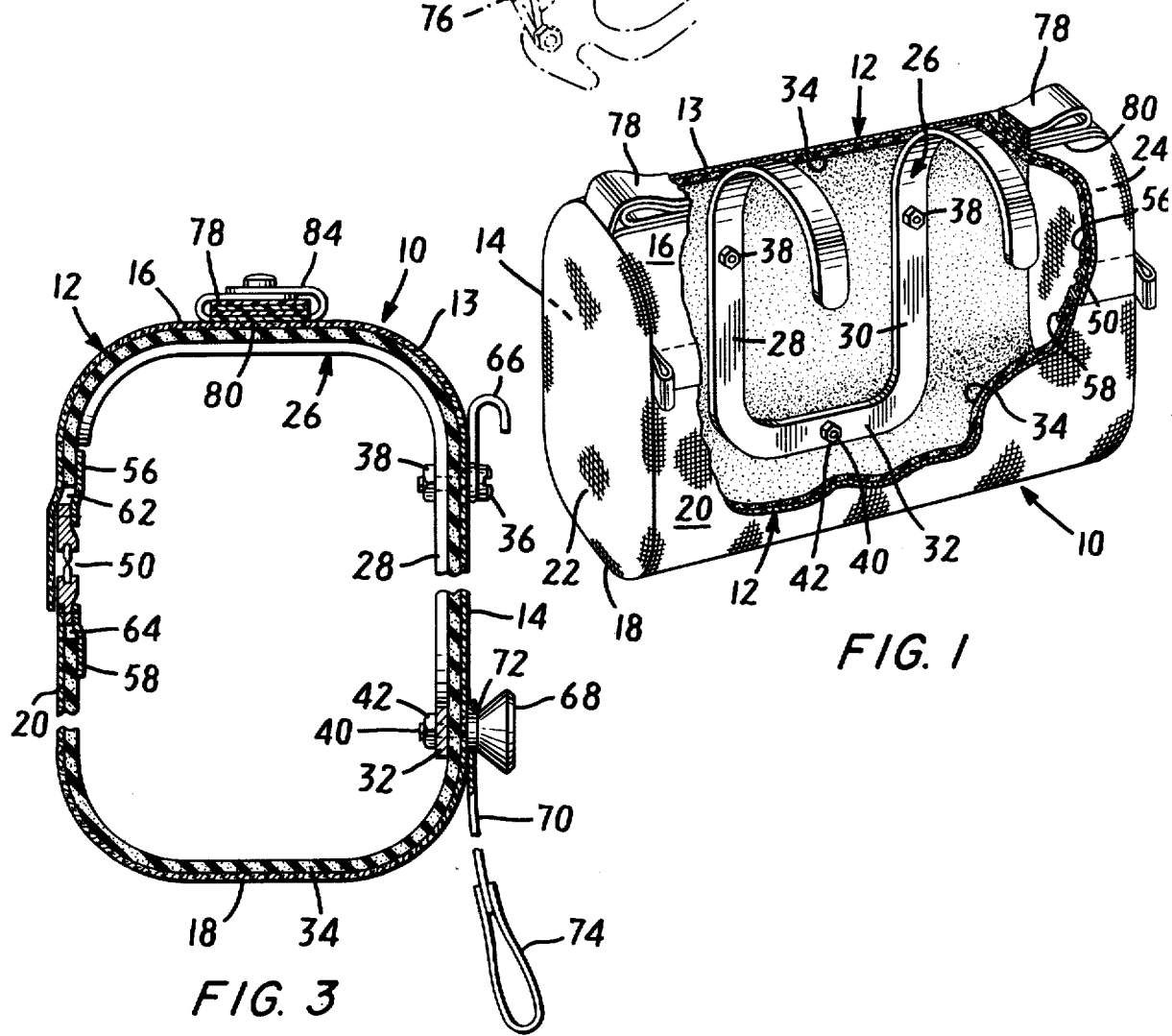
FIG. 3
FIG. 1

U.S. Patent May 11, 1976 Sheet 2 of 2 3,955,727
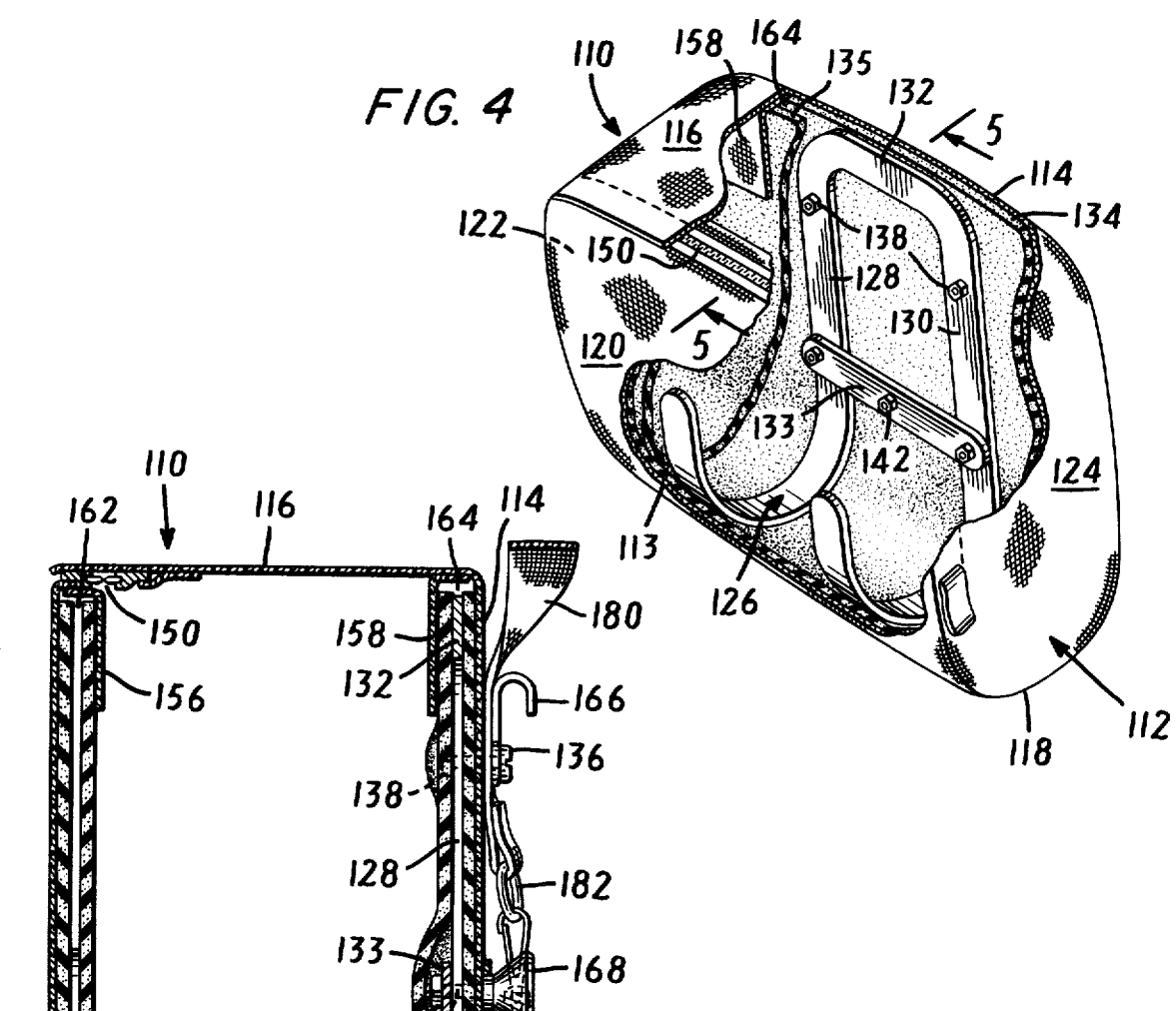

CARRIER BAGS FOR BICYCLES

BACKGROUND OF THE INVENTION

This invention relates to lightweight, durable carrier bags for attachment to bicycles.

Prior to the last two or three years, the most common way for carrying objects on a bicycle has been to place them in some form of basket mounted on the bicycle, the basket usually being an open, "basket-weave" metal gridwork of metal or a plastic or fibrous material. The use of metal, plastic or fiber baskets provided little protection for the objects from the environment, particularly bad weather, so it was often necessary carefully to wrap any objects to be carried in the open types of carrier to ensure that they would not become soiled or wet.

Within the last few years, lightweight bicycle bags have virtually replaced the open wire, plastic or fibrous carriers. Some of the most successful of the lightweight bags have been based on the invention described and shown in U.S. appln. Ser. No. 380,458, filed July 18, 1973, now U.S. Pat. No. 3,903,944, which is owned by the assignee of this invention. That invention relates to a utility bag comprising an outer enclosure of a lightweight, durable fabric and a stiffener within the outer enclosure that imparts shape, strength and durability to the bag in the form of a continuous strip of initially substantially flat, semiflexible, substantially resilient and compressible polymeric foam material. Reference is also made to applicant's copending U.S. patent application Ser. No. 546,017 and 546,140 filed Jan. 31, 1975.

When the utility bag is not used to carry rather heavy loads, the foam liner has served well to support, distribute and protect the load in the bag. However, under heavy loading, such as, for example, the loading often involved when the carrier bags are used for bicycle touring, the bag tends to become misshapen and, in severe cases, can interfere with proper operation of the bicycle. For example, a rear carrier bag, if heavily loaded and not carefully loaded, can become misshapen to the extent of coming into contact with the spokes of the rear wheel. Similarly, a handlebar bag can, under adverse load conditions, sag badly enough to interfere with the front wheel.

SUMMARY OF THE INVENTION

There is provided, in accordance with the present invention, an improvement in lightweight carrier bags for attachment to a bicycle that significantly increases the load-carrying capability of the bag and makes it virtually impossible, even under extremely heavy loading and careless loading, for the bag to become so misshapen as to present any problem in use. More particularly, the improvement involves the provision of a support system for the bag which includes a substantially rigid, three-dimensional frame received within the enclosure and in engagement with at least two walls of the bag, one of the walls being the rear wall. Preferably, the support system further comprises hooks or other means for attachment of the bag to the bicycle that are connected to the frame. Thus, the load in the bag is transmitted from the enclosure to the frame and from the frame to the hooks or other means to the bicycle. The frame is shaped to conform to the walls of the bag that it engages and thus maintains the shape of the bag. The invention is applicable to carrier bags designed for attachment to a rear carrier, to the handlebars and to the seat of the bicycle.

In general, a frame for all of the various types of bags comprises spaced-apart members or portions of a single member that engage the back and either the top or bottom wall of the enclosure, such members or portions of a member being interconnected. In the case of a frame having members or portions of a member engaging the back and top walls, a load in the enclosure is transmitted through the walls of the bag to the top wall and thus generally hangs from the frame. In the case of members or portions of members that engage the back and bottom walls of the enclosure, the load is carried above the frame, usually by being at least partly in substantially direct contact with the frame.

Another aspect of the present invention relates to an improved way of attaching a carrier bag to the rear carrier of a bicycle in a manner that ensures that the bag will not shift position, but will remain stationary. This aspect, which is part of the support system, involves attaching hooks to the frame near the top of the back wall on the outside of the enclosure and providing an elastic extensible cord or belt, one end of which is attached to the frame and the other end of which is arranged to be attached to a portion of the bicycle located below the bag. A positioning member in the form of an element attached to the frame extends out from the back wall of the bag and engages the supporting strut of the carrier. In other words, the support system involves hooking the bag to the top of the rear carrier, pulling down and slightly forward on the lower part of the bag, and restraining the bag from forward and outward movement by engagement of the positioning member with the supporting strut of the rear carrier.

The present invention also includes other improvements including the provision of a convenient carrying strap for hand carrying the bag, an adjustable tension strap or belt, a shoulder strap and appropriate fittings to which the shoulder strap may be attached for permitting two of the bags to be carried in tandem. These and other additional features are described in greater detail below.

For a better understanding of the invention, reference may be made to the following description of exemplary embodiments of the invention, taken in conjunction with the figures of the drawing.

DESCRIPTION OF THE DRAWINGS

FIG. 1 is a pictorial view of one exemplary embodiment of the bag taken from the front and somewhat above, portions the enclosure being broken away to show the three-dimensional frame more clearly;

FIG. 2 is a pictorial view of the bag of FIG. 1 taken from the back and somewhat above, portions also being broken away for clearer illustration;

FIG. 3 is an end cross-sectional view of the bag of FIGS. 1 and 2, the view being taken generally along a plane represented by the lines 3—3 of FIG. 2 and in the direction of the arrows;

FIG. 4 is a pictorial view of another exemplary embodiment of the bag taken from the front and somewhat above, portions of the enclosure being broken away to show the three-dimensional frame more clearly; and FIG. 5 is an end cross-sectional view of the bag of FIG. 4, the view being taken generally along a plane represented by the lines 5—5 of FIG. 4 and in the direction of the arrows.

DESCRIPTION OF EXEMPLARY EMBODIMENTS

As shown in FIG. 1, a bag, which is designated generally by the reference numeral 10 in the drawing, comprises an outer enclosure 12 which includes an outer member 13 made of a lightweight nylon fabric coated with polyurethane to render it waterproof and an inner stiffener or liner (described below). The outer member 13 includes a back wall 14, a top wall 16, a bottom wall 18, a front wall 20 and end walls 22 and 24. It will be evident to those skilled in the art that the construction of the outer enclosure 12 may take various specific forms. As shown, the bag 10 is composed of a single main panel of fabric that forms the front, top, bottom and back walls and separate end panels, the respective end panels being stitched around their perimeters to the ends of the main panel of the bag. A protective shape-giving liner 34 of a semi-flexible, resilient, compressible polymeric foam is received within the bag 10 in coextensive relation with the front wall 20, top wall 16, back wall 14 and bottom wall 18 of the outer member 13. Reference may be made to U.S. appln. Ser. No. 380,458, filed July 18, 1973, for a further description of the liner and its function in lightweight utility bags.

The bag 10 has a support system comprising a substantially rigid, three-dimensional frame 26 which is, preferably, of a lightweight, strong material such as aluminum. The frame 26 includes a pair of spaced-apart legs 28 and 30 which extend generally parallel to each other up the back wall 14 and along the top wall 16 and a crossbar portion 32 which is integral with the legs 28 and 30 and interconnects the legs 28 and 30 near the bottom of the back wall 14. The legs 28 and 30 are fastened to the outer enclosure 12 by screws and nuts 36 and 38, while the crossbar 32 is fastened to the outer enclosure 12 by a screw and a nut 40 and 42. The upper portion of each leg 28 and 30 is curved to conform to the contour of the top wall 16. Therefore, in front and back elevation the frame 26 is U-shaped, while in end elevation the frame 26 is of inverted J-shape.

As shown in FIG. 2, the bag 10 is attached on a rear carrier or rack 44 of a conventional, well-known type that is mounted over the back wheel of a bicycle. Only a portion of the rack 44 is illustrated in FIG. 2, namely a peripheral frame element 46, the front end of which is secured to the bicycle frame behind and below the seat and the rear end of which is supported by struts or rods 48 that extend down from near the back of the frame 46 for attachment to the bicycle frame near the rear axle.

An opening for the outer enclosure 12 extends longitudinally along the front wall 20 at a location near the top of the bag 10 and is provided with a zipper closure 50. Pockets 62 and 64 constituted by strips 56 and 58, respectively, of fabric extending longitudinally along the front wall 20 above and below the opening are stitched on the interior of the outer enclosure 12 by, for example, the zipper stitching 52 and 54 and by the stitching 60 which joins the end walls 22 and 24 to the main panel of the bag. The liner 34 is retained within the outer enclosure 12 by reception fo its respective longitudinal edges within the respective pockets 62 and 64 adjacent the opening to the outer enclosure. Accordingly, the liner 34 is constrained under pressure outwardly against the front wall 20, the top wall 16, the bottom wall 18 and the back wall 14 of the outer enclosure 12 and is thus confined against any substantial movement relative to the outer enclosure 12 in a direction perpendicular to the longitudinal. It should be evident that the frame 26 may be easily and quickly removed from or replaced in the bag 10 by removing the screws 36, 38 and 40, such as for laundering the enclosure.

The bag also includes hooks 66 attached by the screws 36 to the legs 28 and 30 of the frame 26, and a conical spool 68 attached by the screw 40 to the crossbar 32 of the frame 26. The spool 68 functions as a locator member and engages the strut 48 so that shifting of the bag 10 laterally outward from and toward the front of the bicycle is prevented. A tension cord or strap 70 attached to the frame 26, also by the screw 40, is connected to a hook, the retainer strip 70 comprising a strip of webbing having grommeted holes 72 for the screw 40. By providing two or more holes 72, the length, and therefore the tension, of the strap 70 can be altered. The lower end of the strap 70 is provided with a closed elastic loop 74 which engages a hook 76 secured to the frame of the bicycle near the rear axle. The hook 76 is mounted slightly forward of the strut 48 so that the spool 68 will be pulled forward against the strut 48.

Handling the bag 10 when it is not in place on a bicycle is made easier by providing a carrier strap 78 and a handle 80 attached to the top wall 16. The carrier strap 78 may be a strip of webbing (e.g., nylon) of sufficient length to be used as a shoulder strap. When not in use, it can be folded and snap-fastened to the top wall 16 by webbing loops 82 and 84. The handle 80 is a short piece of webbing stitched flat on the top wall 16 of the bag 10 and underlying the carrier strap 78.

As shown in FIG. 4, another form of bag, which is designated generally by the reference numeral 110 in the drawing, comprises an outer enclosure 112 which includes an outer member 113 composed of two panels of fabric, one panel forming the top and end walls 116, 122 and 124 and the other forming the front, bottom and back walls 120, 118 and 114. A pair of protective shape-giving liners 134 and 135 having the characteristics referred to above (see also U.S. appln. Ser. No. 380,458, filed July 18, 1973) are received within the bag 110 in coextensive relation with the front wall 120, bottom wall 118 and back wall 114 of the outer member 113.

The bag 110 further includes a support system in the form of a substantially rigid, three-dimensional frame 126 having a pair of spaced-apart legs 128 and 130 which extend generally parallel to each other along the back wall 114, the bottom wall 118 and at least the lower portion of the front wall 120. A crossbar 132 integral with the legs 128 and 130 interconnects them near the top of the back wall 114. Another crossbar 133 also interconnects the legs 128 and 130 near the bottom of the back wall 114. The legs 128 and 130 are fastened to the outer enclosure 112 by screws and nuts 136 and 138, while the crossbar 133 is fastened to the outer enclosure 112 by a screw 140 and a nut 142. The lower portion of each leg 128 and 130 is curved to conform to the contour of the bottom wall 118. Therefore, in front and back elevation the frame 126 is of inverted U-shape, while in end elevation the frame 126 is J-shaped. With the additional crossbar 133 connected between the legs 128 and 130, the frame 126, in front and back elevation, is approximately A-shaped.

An opening for the enclosure extends along the intersection of the front wall and the top wall and along the upper portions of the intersection of the front wall with the end walls and is provided with a zipper closure 150. The liners 134 and 135 are retained within the outer enclosure 112 by reception of their respective longitudinal edges within respective pockets 162 and 164 constituted by strips 156 and 158, respectively, of fabric extending longitudinally along the upper portion of the front wall 120 and the back wall 114, respectively.

As shown in FIG. 5, the bag 110 has generally C-shaped hooks 166 attached by the screws 136 to the bag frame 126, and a conical spool 168 secured to the independent crossbar 133 by the screw 140. A retainer belt 170 attached to the frame 126, also by the screw 140, is connected by a buckle 172 to an adjustable tension strap 171. The lower end of the strap 171 is provided with a closed elastic loop 174 which engages a S-hook 176 secured to the frame of the bicycle near the rear axle. Thus, like the embodiment of FIGS. 1-3, the bag 110 may be attached on a rear carrier or rack (not shown) of a conventional, well-known type that is mounted over the back wheel of a bicycle. In use on a rear carrier, the spool 168 and the retainer belt 170 are arranged, as described in the description of the embodiment of FIGS. 1-3, to resiliently hold the bag 110 in position. Instead of being directly connected to the spool 168, the retainer belt 170 may be attached to the independent crossbar 133 by a triangular strap holder (not shown) having a slot for receiving the belt 170 and an aperture for receiving the screw 140.

To facilitate handling the bag 110 when it is not in place on a bicycle, the bag is provided with a handle 180 attached to the upper portion of the rear wall 114 by the screws 136. A carrier strap 178 of sufficient length to be used as a shoulder strap is fastened by snap-type hooks to rings 182 at the ends of the handle 180. The shoulder strap 178 may be snapped onto the rings 182 of two bags so that they may be carried back to back in tandem.

The above-described embodiments of the invention are intended to be merely exemplary, and numerous variations and modifications of them may be made by those skilled in the art without departing from the spirit and scope of the invention. All such variations and modifications are intended to be included within the scope of the invention as defined in the appended claims.

I claim:

1. A carrier bag for attachment to bicycles or the like comprising an outer enclosure of semi-flexible material having a top wall, a bottom wall, left and right end walls, and front and back walls defining an enclosed volume a substantially rigid, three-dimensional frame member received within and joined to the outer enclosure and shape to match and positioned in engagement with at least two adjacent walls of the enclosure, one of said walls being the back wall, the frame member including strips of rigid material defining a pair of spaced apart generally j-shaped legs, the straight portions of which engage the back wall of the enclosure and the curved portions of which engage at least one of the top and bottom walls of the enclosure, and a pair of hooks on the outside of the back wall of the enclosure, one hook being connected to the straight portion of each leg of the frame member and the hooks being adapted to be attached to a bicycle, whereby a load in the enclosure is transmitted from the enclosure to the frame, from the frame to the hooks and from the hooks to the bicycle.

2. A carrier bag according to claim 1 wherein the frame member includes a strip connecting the spaced-apart legs.

3. A carrier bag according to claim 2 wherein the frame member is a single strip of substantially rigid material, the connecting strip being joined integrally to the legs such that the frame member is generally U-shaped when viewed from one direction and is generally J-shaped when viewed from a direction oriented 90° with respect to the aforementioned one direction.

4. A carrier bag according to claim 1 and particularly adapted for mounting on a rear carrier of a bicycle and wherein each of the hooks is connected to the frame member near the top of the back wall for attachment to the rear carrier and a resiliently extensible band or spring attached to the frame member and being adapted to be connected under tension to a portion of the bicycle located below the bag.

5. A carrier bag according to claim 4 and further comprising a locator member joined to the frame member and projecting exteriorally away from the back of the back wall of the bag in a position for engagement with a generally vertical strut by which the bicycle rear carrier is supported.

6. A carrier bag according to claim 1 wherein, the frame member includes a generally flat inverted U-shaped portion positioned in engagement with the back wall of the enclosure and wherein the curved portions of the j-shaped legs extend, from the U-shaped portion into engagement with the bottom wall of the bag, the frame member being a single band of substantially rigid material and being secured to at least the back wall of the enclosure.

7. A carrier bag according to claim 6 wherein the generally curved portions of the frame member engage a lower portion of the front wall.

8. A carrier bag according to claim 6 wherein the frame member includes a strip connecting the spaced-apart legs near the bottom of the rear wall.

9. A carrier bag according to claim 8 wherein the frame member is a single strip of substantially rigid material, the connecting strip being joined to the legs such that the frame member is generally A-shaped when viewed from one direction and is generally J-shaped when viewed from a direction oriented 90° with respect to the aforementioned one direction.

10. A carrier bag according to claim 6 and particularly adapted for mounting on a rear carrier of a bicycle and further comprising a pair of hooks, each of which is connected to the frame member near the top of the back wall for attachment to the rear carrier and an adjustable belt with a buckle attached to the connecting strip and being adapted to be connected under tension to a portion of the bicycle located below the bag.

11. A carrier bag according to claim 6 and further comprising a locator member joined to the frame and projecting exteriorally away from the back of the back wall of the bag in a position for engagement with a generally vertical strut by which the bicycle rear carrier is supported.

12. A carrier bag according to claim 6 wherein the enclosure includes two inner liners, each of which is a continuous strip of semi-flexible, resilient, compressible polymeric foam, the two liners both being coextensive with the front, bottom and back walls of the enclosure, and wherein the frame is located between the two liners.

* * * * *